(12) United States Patent
Sud

(10) Patent No.: US 9,804,999 B2
(45) Date of Patent: Oct. 31, 2017

(54) SIGNAL/NOISE SEPARATION USING FRFT ROTATIONAL PARAMETER OBTAINED IN RELATION TO WIGNER DISTRIBUTION

(71) Applicant: The Aerospace Corporation, El Segundo, CA (US)

(72) Inventor: Seema Sud, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 160 days.

(21) Appl. No.: 14/963,329

(22) Filed: Dec. 9, 2015

(65) Prior Publication Data
US 2017/0168988 A1    Jun. 15, 2017

(51) Int. Cl.
*G06F 17/14* (2006.01)

(52) U.S. Cl.
CPC .................... *G06F 17/14* (2013.01)

(58) Field of Classification Search
CPC ......................................... G06F 17/14
USPC ........................................... 708/403
See application file for complete search history.

(56) References Cited

U.S. PATENT DOCUMENTS 5,845,241 A * 12/1998 Owechko .............. G06F 17/141
704/203

2002/0030623 A1* 3/2002 Arikan .................... G01S 7/295
342/195
2004/0042531 A1* 3/2004 Arikan ................. H04B 1/7115
375/148
2004/0220986 A1* 11/2004 Pisoni ................... G06F 17/141
708/403

OTHER PUBLICATIONS

Almeida, L.B., "The Fractional Fourier Transform and Time-Frequency Representation", IEEE Trans. on Signal Processing, vol. 42, No. 11 (Nov. 1994).
Candan, C., Kutay, M.A., and Ozaktas, H.M., "The Discrete Fractional Fourier Transform", IEEE Trans. on Sig. Proc., vol. 48, pp. 1329-1337 (May 2000).

(Continued)

*Primary Examiner* — Tan V. Mai
(74) *Attorney, Agent, or Firm* — LeonardPatel PC

(57) ABSTRACT

A novel approach provides accurate estimation of the parameter a of a Fractional Fourier Transform (FrFT). A value of a may be selected for which the Wigner Distributions (WDs) of a signal-of-interest (SOI) and interference overlap as little as possible. However, instead of computing the WD for each signal, the FrFT may be computed for each WD, recognizing that the projection of the WD of a signal onto an axis $t_a$ is the energy of the FrFT along the same axis. Since the technique computes a using the SOI and a measure of the interference separately, significant improvements can be made in the estimate, especially at low signal-to-noise ratio (SNR). Once the estimate is obtained, a reduced rank filter may be applied to remove the interference, since minimum mean-square error (MMSE) approaches will again fail when using the low sample support required of non-stationary environments. The technique is not only computationally more efficient than MMSE, but far more robust as well.

44 Claims, 11 Drawing Sheets

(56) References Cited

OTHER PUBLICATIONS

Candan, C., Kutay, M.A., and Ozaktas, H.M., "The Discrete Fractional Fourier Transform", Proc Int. Conf. on Acoustics, Speech, and Sig. Proc. (ICASSP), Phoenix, AZ, pp. 1713-1716, (Mar. 15-19, 1999).

Goldstein, J.S., and Reed, I.S., "A New Method of Wiener Filtering and its Application to Interference Mitigation for Communications", Proceedings of IEEE MILCOM, vol. 3, pp. 1087-1091, Monterey,CA (Nov. 1997).

Goldstein, J.S., and Reed, I.S., "Multidimensional Wiener Filtering Using a Nested Chain of Orthogonal Scalar Wiener Filters", University of Southern California, CSI-96-12-04 (Dec. 1996).

Goldstein, J.S., Optimal Reduced Rank Statistical Signal Processing, Detection, and Estimation Theory, Ph.D. Thesis, Dept. of Electrical Engineering, University of Southern California, Los Angeles, CA (Dec. 1997).

Goldstein, J.S., Reed, I.S., and Scharf, L.L, "A New Method of Wiener Filtering", Proceedings of the 1st AFOSR/DSTO Workshop on Defense Applications of Signal Processing, Victor Harbor, Australia (Jun. 1997).

Kutay, M.A., Ozaktas, H.M., Arikan, O., and Onural, L., "Optimal Filtering in Fractional Fourier Domains", IEEE Trans. on Sig. Proc., vol. 45, No. 5 (May 1997).

Kutay, M.A., Ozaktas, H.M., Onural, L., and Arikan, O. "Optimal Filtering in Fractional Fourier Domains", Proc. IEEE International Conf. on Acoustics, Speech, and Signal Proc. (ICASSP), vol. 2, pp. 937-940 (1995).

Lin, Q., Yanhong, Z., Ran, T., and Yue, W., "Adaptive Filtering in Fractional Fourier Domain", International Symposium on Microwave, Antenna, Propagation, and EMC Technologies for Wireless Communications Proc., pp. 1033-1036 (2005).

O'Toole, J.M., Mesbah, M., and Boashash, B., "Discrete Time and Frequency Wigner-Ville Distribution: Properties and Implementation", Proc. Int. Symposium on Digital Sig. Proc. and Comm. Systems, Noosa Heads, Australia (Dec. 19-21, 2005).

Reed, I.S., Mallett, J.D., and Brennan, L.E., "Rapid Convergence Rate in Adaptive Arrays", IEEE Trans. on Aerospace and Electronic Systems, vol. 10, pp. 853-863 (Nov. 1974).

Ricks, D.C., and Goldstein, J.S., "Efficient Architectures for Implementing Adaptive Algorithms", Proc. of the 2000 Antenna Applications Symposium, pp. 29-41, Allerton Park, Monticello, Illinois (Sep. 20-22, 2000).

Subramaniam, S., Ling, B.W., and Georgakis, A., "Filtering in Rotated Time-Frequency Domains with Unknown Noise Statistics", IEEE Trans. on Sig. Proc., vol. 60, No. 1 (Jan. 2012).

\* cited by examiner

SIGNAL/NOISE SEPARATION USING FRFT ROTATIONAL PARAMETER OBTAINED IN RELATION TO WIGNER DISTRIBUTION

FIELD

The present invention generally pertains to signal separation and interference suppression, and more specifically, to separating a signal-of-interest (SOI) from interference and/or noise using a Fractional Fourier Transform (FrFT) rotational parameter obtained in relation to a Wigner Distribution (WD).

BACKGROUND

The Fractional Fourier Transform (FrFT) has a wide range of applications in fields such as optics, quantum mechanics, image processing, and communications. The FrFT of a function f(x) of order a is defined as $$F^{a}[f(x)] = \int_{-\infty}^{\infty} B_{a}(x,x')f(x')dx' \quad (1)$$

where the kernel $B_a(x, x')$ is defined as $$B_a(x, x') = \frac{e^{i(\pi\hat{\phi}/4 - \phi/2)}}{|\sin(\phi)|^{1/2}} \times e^{i\pi(x^2 \cot(\phi) - 2xx' \csc(\phi) + x'^2 \cot(\phi))} \quad (2)$$

where $\phi = a\pi/2$ and $\hat{\phi} = \text{sgn}[\sin(\phi)]$. This applies to the range $0 < |\phi| < \pi$, or $0 < |a| < 2$. In discrete time, the N×1 FrFT of an N×1 vector can be modeled as $$X_a = F^a x \quad (3)$$

where $F^a$ is an N×N matrix whose elements are given by $$F^{a}[m, n] = \sum_{k=0, k \neq (N-1+(N)_2)}^{N} u_k[m] e^{-j\frac{\pi}{2}ka} u_k[n] \quad (4)$$

and where $u_k[m]$ and $u_k[n]$ are the eigenvectors of the matrix S defined by $$S = \begin{pmatrix} C_0 & 1 & 0 & \cdots & 1 \\ 1 & C_1 & 1 & \cdots & 0 \\ 0 & 1 & C_2 & \cdots & 0 \\ \vdots & \vdots & \vdots & \ddots & \vdots \\ 1 & 0 & 0 & \cdots & C_{N-1} \end{pmatrix} \quad (5)$$

and $$C_n = 2\cos\left(\frac{2\pi}{N}n\right) - 4 \quad (6)$$

The FrFT is a useful approach for separating a signal-of-interest (SOI) from interference and/or noise when the statistics of either are non-stationary (i.e., at least one device is moving, Doppler shift occurs, time-varying signals exist, there are drifting frequencies, etc.). The FrFT enables translation of the received signal to an axis in the time-frequency plane where the SOI and interference/noise are not separable in the frequency domain, as produced by a conventional Fast Fourier Transform (FFT), or in the time domain.

The Wigner Distribution (WD) is a time-frequency representation of a signal. The WD may be viewed as a generalization of the Fourier Transform, which is solely the frequency representation. The WD of a signal x(t) can be written as $$W_x(t,f) = \int_{-\infty}^{\infty} x(t+\tau/2) x^*(t-\tau/2) e^{-2\pi j \tau f} d\tau \quad (7)$$

The projection of the WD of a signal x(t) onto an axis $t_a$ gives the energy of the signal in the FrFT domain a, $|X_a(t)|^2$. Letting $\alpha = a\pi/2$, this may be written as $$|X_\alpha(t)|^2 = \int_{-\infty}^{\infty} W_x(t\cos(\alpha) - f\sin(\alpha), t\sin(\alpha) + f\cos(\alpha)) df \quad (8)$$

In discrete time, the WD of a signal x[n] can be written as $$W_x\left[\frac{n}{2f_s}, \frac{kf_s}{2N}\right] = e^{j\frac{\pi}{N}kn} \sum_{m=l_1}^{l_2} x[m] x^*[n-m] e^{j\frac{\pi}{N}km} \quad (9)$$

where $l_1 = \max(0, n-(N-1))$ and $l_2 = \min(n, N-1)$. This particular implementation of the discrete WD is valid for non-periodic signals. Aliasing is avoided by oversampling the signal x[n] using a sampling rate $f_s$ (samples per second) that is at least twice the Nyquist rate.

When applying the FrFT to perform interference suppression, the rotational parameter a should first be estimated. Conventional approaches rely on choosing the value of a, $0 \leq a \leq 2$, which produces a minimum mean-square error (MMSE) between a desired (i.e., training) signal and its estimate. When the environment is non-stationary, it is necessary to perform this estimation with very few samples, i.e., before the statistics of the received signal change significantly. When this is not done, large estimation errors, which result in poor interference suppression, can occur. MMSE-based algorithms, however, require a large number of samples in practice. Hence, their performance will be suboptimal in non-stationary environments. Accordingly, an improved approach to signal separation may be beneficial.

SUMMARY

Certain embodiments of the present invention may be implemented and provide solutions to the problems and needs in the art that have not yet been fully solved by conventional signal separation approaches and systems. For example, some embodiments of the present invention apply a novel approach that provides accurate estimation of a. A value of a may be selected for which the WDs of the SOI and interference overlap less, and in some embodiments, as little as possible. However, instead of computing the WD for each signal, the FrFT may be computed for each WD, recognizing that the projection of the WD of a signal onto an axis $t_a$ is the energy of the FrFT along the same axis. Since the technique of some embodiments computes a using the SOI and a measure of the interference separately, significant improvements can be made in the estimate, especially at a low signal-to-noise ratio (SNR). Once the estimate is obtained, a reduced rank filter may be applied to remove the interference, since MMSE approaches will again fail when using the low sample support required of non-stationary environments. In some embodiments, four samples (2 bits at 2 samples per bit) or eight samples (4 bits at 2 samples per bit) may be sufficient to effectively separate the SOI and suppress interference/noise. A higher number of samples may improve the accuracy. However, the number of samples depends on how "non-stationary" the interference or channel is. In other words, the more the interference or channel varies, the fewer samples that are available to use because the samples need to be captured over a small enough window that the received signal is approximately stationary. The technique of some embodiments is shown not only to be computationally more efficient than MMSE, but far more robust as well.

In one embodiment, a computer-implemented method includes determining, by a computing system, a value of a parameter a for a FrFT for which a projection of a product of a WD reduces interference, noise, complex time-varying channel, or any combination thereof, in a received signal so that a SOI can be separated. The computer-implemented method also includes filtering out the interference, noise, complex time-varying channel, or any combination thereof, by the computing system and separating out the SOI from the interference, noise, complex time-varying channel, or any combination thereof, by the computing system.

In another embodiment, a computer program embodied on a non-transitory computer-readable medium. The program configured to cause at least one processor to determine a value of a rotational parameter a for a FrFT for which a new time-frequency axis $t_a$ defined by the rotational parameter a reduces interference, noise, a complex, time-varying channel, or any combination thereof, in a received signal so that a SOI can be separated. The program is also configured to cause the at least one processor to separate out the SOI from the interference, noise, complex, time-varying channel, or any combination thereof, by filtering out the interference, noise, complex, time-varying channel, or any combination thereof.

In yet another embodiment, a computer-implemented method includes determining, by a computing system, a value of a rotational parameter a for a FrFT for which a new time-frequency axis $t_a$ defined by the rotational parameter a reduces interference, noise, or both, in a received signal so that a SOI can be separated. The computer-implemented method also includes separating out, by the computing system, the SOI from the interference, noise, complex, time-varying signal, or any combination thereof, by filtering out the interference, noise, complex time-varying signal, or any combination thereof.

In still another embodiment, a computer-implemented method includes determining, by a computing system, a value of a rotational parameter a for a FrFT for which a new time-frequency axis $t_a$ defined by the rotational parameter a reduces a complex, time-varying channel in a received signal so that a SOI can be separated. The computer-implemented method also includes separating out, by the computing system, the SOI from the complex, time-varying channel, or any combination thereof, by filtering out the interference, noise, complex, time-varying channel, or any combination thereof.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a novel approach to finding the optimal parameter a for a FrFT for which the projection of the product of the WD of the SOI and interference/noise are significantly reduced or at a minimum. This may also correspond to the value of a for which the product of the energies of the SOI and interference in the FrFT domain is minimized Certain embodiments may be used to separate signals from interference/noise for cellular communications, satellite communications, separating radar from clutter, in image processing, speech recognition, or any other suitable application where a signal is to be separated from interference/noise without deviating from the scope of the invention.

Such an approach can provide significant interference suppression improvements and better speed as compared with applications of MMSE when the SOI or interference is non-stationary. Also, such an approach may provide improvement even when a transmitter of a signal is stationary, but changes occur due to drift, power on/off, etc. Conventional MMSE-based techniques are computational, and they do not provide good estimates when the SNR or sample support is kept low, as is required in non-stationary environments.

Following estimation of a, some embodiments employ a reduced rank multistage Wiener filter (MWF), which removes the non-stationary interference. Since the SOI and interference may be completely separable by filtering along the optimum FrFT axis $t_a$, significant interference suppression may be obtained regardless of SNRs, where all other known techniques fail. The performance improvement of some embodiments over MMSE-based approaches is demonstrated by simulation, using several examples of non-stationary signals, and also the proposed algorithm of some embodiments is compared to the FFT, which fails in non-stationary environments.

Figure 1:
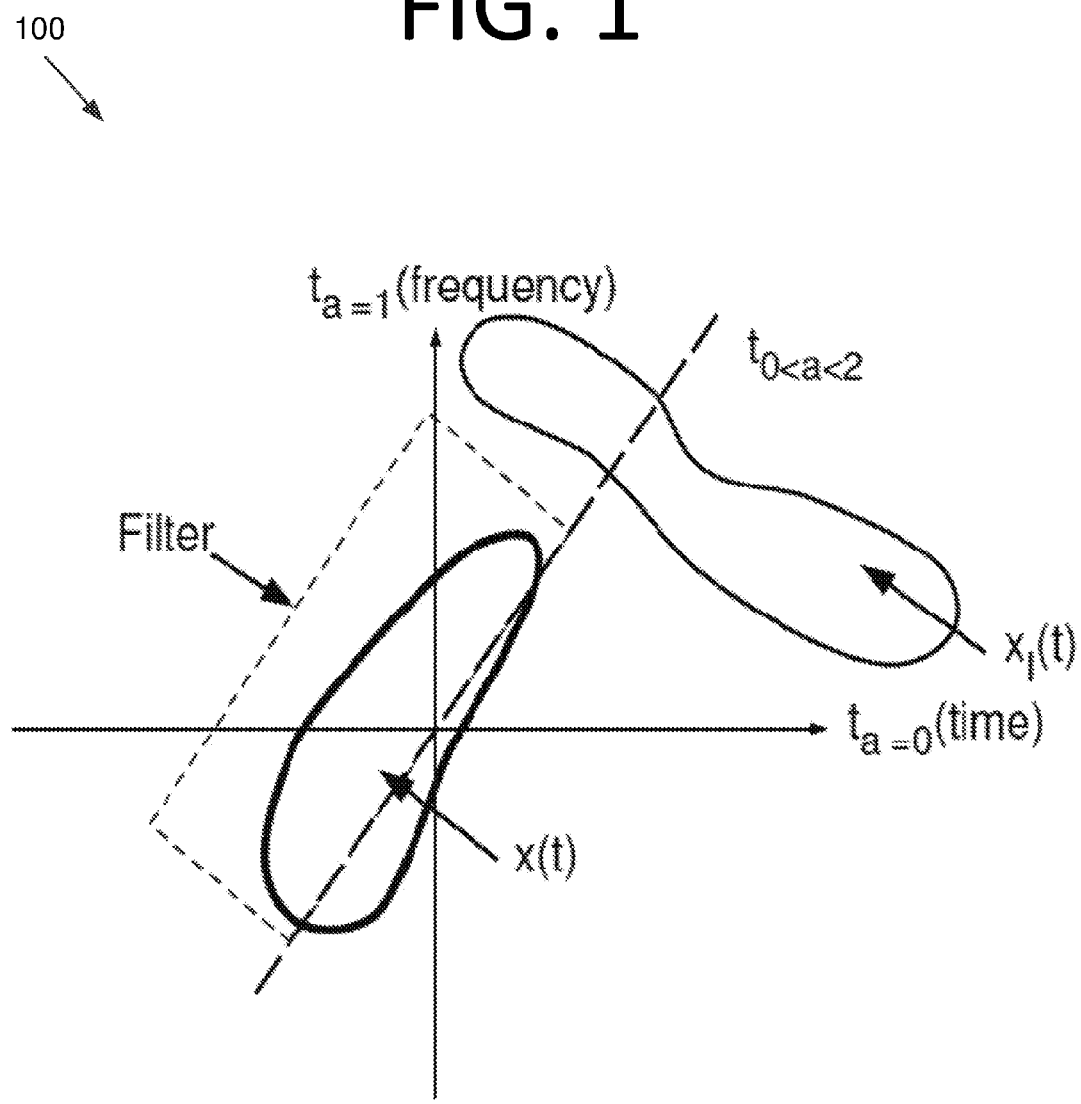
FIG. 1 is a graph illustrating a Wigner Distribution (WD) of an example signal and interference with an optimum axis for rotation, according to an embodiment of the present invention.

The WD of a signal and interference is shown in graph 100 of FIG. 1. The WD shown in FIG. 1 illustrates how the FrFT may be used to improve interference cancellation. In non-stationary environments, both the SOI x(t) and the interference $x_I(t)$ vary as a function of time and frequency. The WD shows how they both vary independently. Note that they overlap in the time domain ($t_{a=0}$) and the frequency domain ($t_{a=1}$). However, some axis $t_a$, $0<a<2$, exists where there is no overlap in this example. If the optimum axis can be found and rotated using the FrFT, the interference may be filtered out in the new domain and significant interference suppression improvements may be achieved over conventional time (e.g., MMSE) or frequency (e.g., FFT) filtering. MMSE can also be performed in the FrFT domain, as is shown in the examples of FIGS. 5-9 below.

Problem Formulation

Without loss of generality, consider a digital binary sequence whose elements are in (−1, +1) to be estimated in the presence of non-stationary interference, and possibly a non-stationary channel. The signal is further corrupted by additive white Gaussian noise (AWGN). Here, the carrier is ignored, and hence, the SOI is modeled as a baseband binary phase shift keying (BPSK) signal. The number of bits per block is denoted $N_1$, and if each bit is oversampled by a factor of samples per bit (SPB), the number of samples per block in the BPSK signal is $N=N_1 SPB$, and the signal is denotes in discrete time, vector form as the N×1 vector x(i). This SOI is corrupted by a non-stationary interferer $x_I(i)$, for which several examples are given later herein, and by an AWGN signal n(i). Later, the case is modeled where the interference is not another signal, but rather, a non-stationary channel h (i) that is convolved with the SOI. Here, index i denotes the $i^{th}$ sample, where i=1,2, ..., N, and N is the total number of samples per block that are processed. M blocks (or trials) are then processed to obtain a statistical estimate of the MMSE. The received signal y(i) is then $$y(i)=x(i)+x_I(i)+n(i) \quad (10)$$

An estimate of the transmitted signal x(i), denoted $\hat{x}(i)$, is obtained by first transforming the received signal to the FrFT domain, applying an adaptive filter, and taking the inverse FrFT. This may be written as $$\hat{x}(i)=F^{-a}GF^a y(i) \quad (11)$$

where $F^a$ and $F^{-a}$ are the N×N FrFT and inverse FrFT matrices of order a, respectively, and $$g=\text{diag}(G)=(g_0,g_1, \ldots, g_{N-1}) \quad (12)$$

is an N×1 set of optimum filter coefficients to be found. The notation diag(G)=($g_0,g_1, \ldots, g_{N-1}$) means that matrix G has the scalar coefficients $g_0,g_1, \ldots, g_{N-1}$ as its diagonal elements, with all other elements equal to zero.

Conventional Approaches for Estimating a

One conventional approach for estimating a is the MMSE-FrFT approach. MMSE-based approaches aim to minimize the error between the desired signal x(i) and its estimate $\hat{x}(i)$. In other words, the cost function $$J(g) = \frac{1}{M}\sum_{i=1}^{M} \|F^{-a}GF^a y(i) - x(i)\|^2 \quad (13)$$

is minimized The optimum set of filter coefficients $g_0$ that minimizes the cost function in Eq. (13) can be obtained by setting the partial derivative of the cost function to zero. In other words, $g_0$ may be computed such that $$\left.\frac{\partial J(g)}{\partial g}\right|_{g=g_0} = 0 \quad (14)$$

This is the MMSE-FrFT solution, given by $$g_{0,MMSE-FrFT}(i)=1/2 Q^{-1}(i)b(i) \quad (15)$$

where $$Q(i)=(F^{-a}Z(i))^H(F^{-a}Z(i)) \quad (16)$$

$$z(i)=[z_0(i),z_1(i), \ldots, z_{N-1}(i)]^T=\text{diag}(Z(i))=F^a y(i) \quad (17)$$

and $$b(i)=(-2Re(x^H(i)F^{-a}Z(i)))^T \quad (18)$$

Thus, a value of a is chosen that minimizes the cost function in Eq. (13). However, the cost function must be computed over the range of a from 0<a<2 by first computing $g_{0,MMSE-FrFT}$ from Eq. (15) to find the best value of a. Note that this solution also requires a training sequence, x(i). The LMS-FrFT solution will perform comparably to the MMSE-FrFT algorithm over time, so it was not included in the simulations presented herein.

Another conventional approach for estimating a is the MMSE-FFT approach. This solution is obtained by setting a=1 in calculating $g_0$ from Eq. (15)-(18). The solution becomes one of applying the optimum filter given by Eq. (15) in the frequency domain since $F^1$ reduces to a FFT and $F^{-1}$ is an inverse FFT (IFFT). In other words, $$g_{0,MMSE-FFT}(i)=g_{0,MMSE-FrFT}(i)|_{a=1} \quad (19)$$

Approach for Estimating a Using the Relationship Between the FrRT and the WD

Some embodiments seek a way to estimate the optimum value of a by considering three factors: (1) it is not desirable to use the received signal y(i) because this signal contains the SOI and interference together, making separation of the two more difficult; (2) it is not desirable to require a large number of samples N since this would result in errors in non-stationary channels and more computational complexity in performing the estimate; and (3) it is not desirable to perform matrix inversions because even with a relatively small number of samples N, the computational complexity is $\mathcal{O}(N^3)$.

Note from FIG. 1 that the optimum rotational axis is that for which the desired signal and interference do not overlap, or in the practical case, overlap as little as possible. Hence, the WD of both the SOI and the interference (i.e., collect data with the SOI turned off) may be plotted and searched over the range of a to find the minimum However, the discrete-time WD evaluated at an arbitrary rotational axis is difficult to compute. Instead, from Eq. (8), note that the WD can be more easily computed along each axis $t_a$ by computing the energy of the FrFT along that axis. Hence, some embodiments compute the energy of the FrFT of both the SOI and interference/noise, compute their product, sum the values over the new time-frequency axis $t_a$ defined by the rotational parameter a, and select the value for which the result is minimum as the optimum a.

Figure 2:
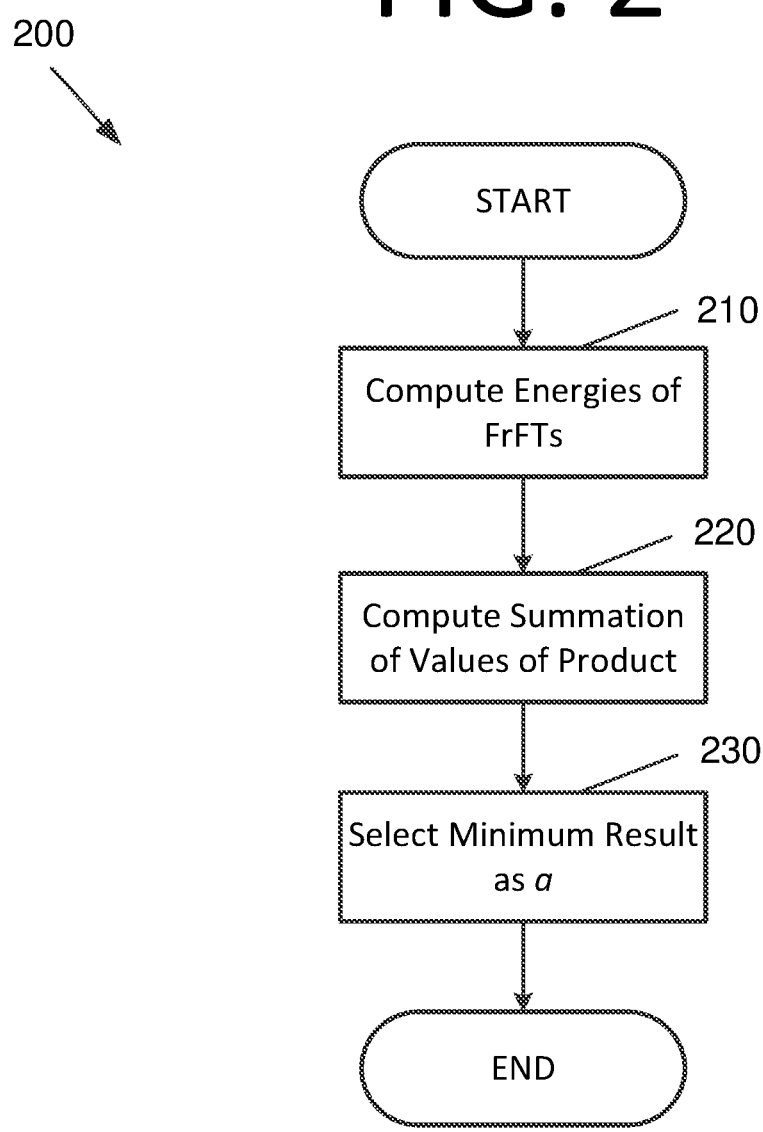
FIG. 2 is a flowchart illustrating a process for finding the optimum value of a, according to an embodiment of the present invention.

The proposed algorithm of some embodiments is shown in flowchart 200 of FIG. 2. The process begins with computing energies of the FrFTs of both the SOI and the interference, noise, complex, time-varying channel, or any combination thereof, at 210. A summation of values of the product of the energies is computed over a new time-frequency axis $t_a$ defined by the rotational parameter a at 220. A value of a is then selected for which a result is minimum as an optimum a at 230.

Figure 3:
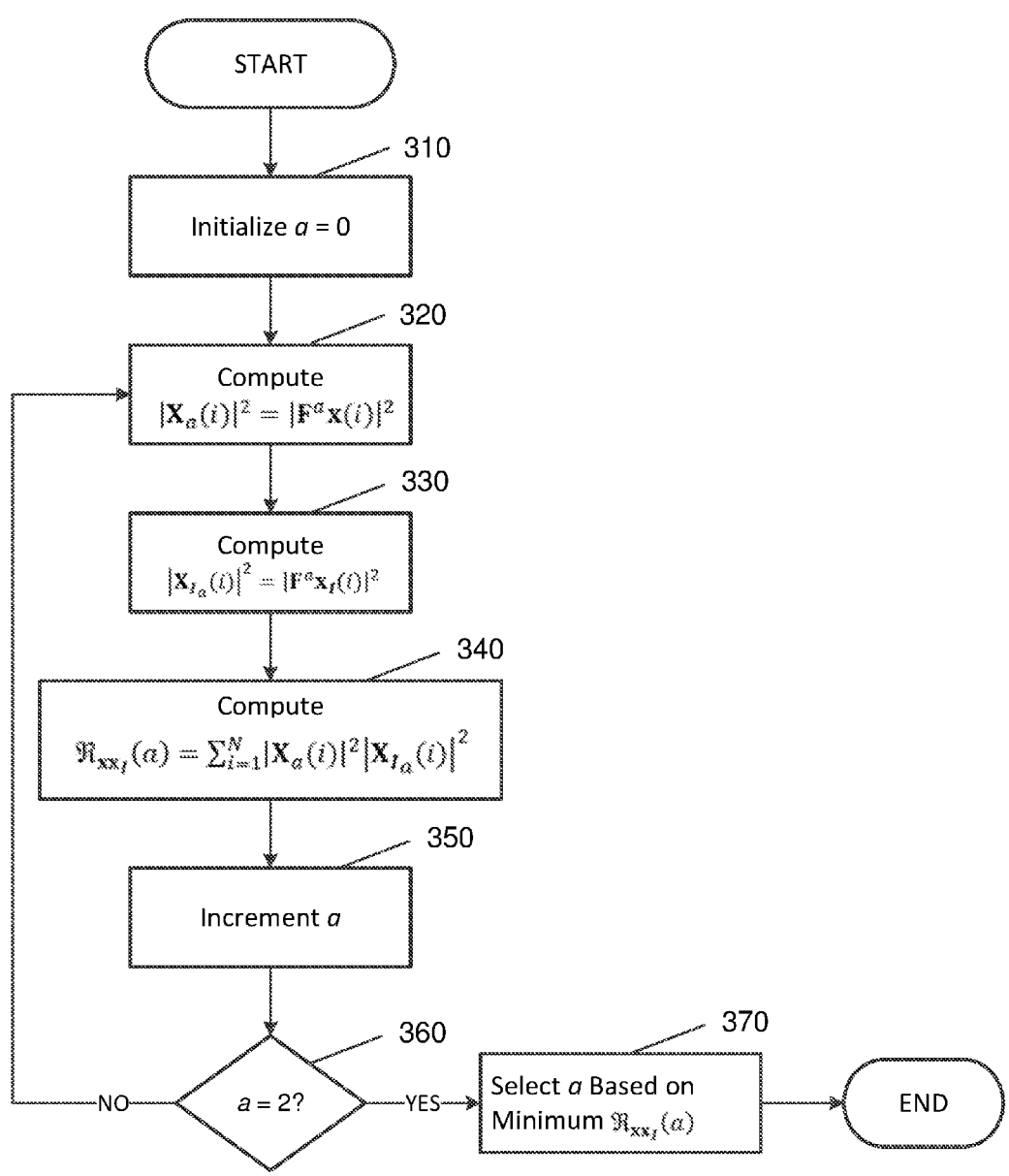
FIG. 3 is a flowchart illustrating a process for finding the optimum value of a when interference, noise, or both, are present, according to an embodiment of the present invention.

FIG. 3 is a flowchart 300 illustrating a process for finding the optimum value of a when interference, noise, or both, are present, according to an embodiment of the present invention. The process begins with initializing a=0 at 310. The energy of the FrFT of the SOI is computed using $|X_a(i)|^2=|F^a x(i)|^2$ at 320. The energy of the FrFT of the interference, noise, or both, is computed using $|X_{I_a}(i)|^2=|F^a x_I(i)|^2$ at 330. Then, a summation of the values of the product of the energies is computed over a new time-frequency axis $t_a$ defined by the rotational parameter a using $\Re_{XX_I}(a)=\Sigma_{i=1}^N |X_a(i)|^2 |X_{I_a}(i)|^2$ at 340, and a is incremented at 350.

If a is not yet equal to 2 at 360, the process of steps 320, 330, 340 are repeated. If a=2 at 360, a is selected based on a value where $\Re_{XX_I}(a)$ is minimum at 370. The process then ends.

$F^a$ is defined in Eq. (4) above. If the distortion is not an interfering signal $x_I(i)$, but is instead a complex, time-varying channel h(i), written as an L×1 channel vector $$h(i)=[h_1(i), h_2(i), \ldots, h_L(i)]^T \quad (20)$$

then the received signal may be written as $$y(i)=x(i)*h(i)+n(i) \quad (21)$$

where the * operator denotes convolution. The algorithm of some embodiments may still be applied by computing $$|H_a(i)|^2=|F^a h(i)|^2 \quad (22)$$

at step 330 and replacing $\Re_{XX_I}(a)$ above with $$\Re_{XH}(a)=\sum_{i=1}^N |X_a(i)|^2 |H_a(i)|^2 \quad (23)$$

at step 340. This algorithm requires a search over all a, just like the MMSE approach. However, it performs faster and provides significantly better estimates, resulting in better interference suppression. Note also that a training sequence is generally beneficial here. In the absence of a training sequence, the received signal may be used, but a performance loss may result. It is further important to note that step 320 in FIG. 3 requires calculation of the FrFT of the interference environment. Since the algorithm operates with very few samples, this can be computed in gaps where the SOI is off, as in a TDMA signal, or using empty subcarriers, as in OFDM, etc.

Figure 4:
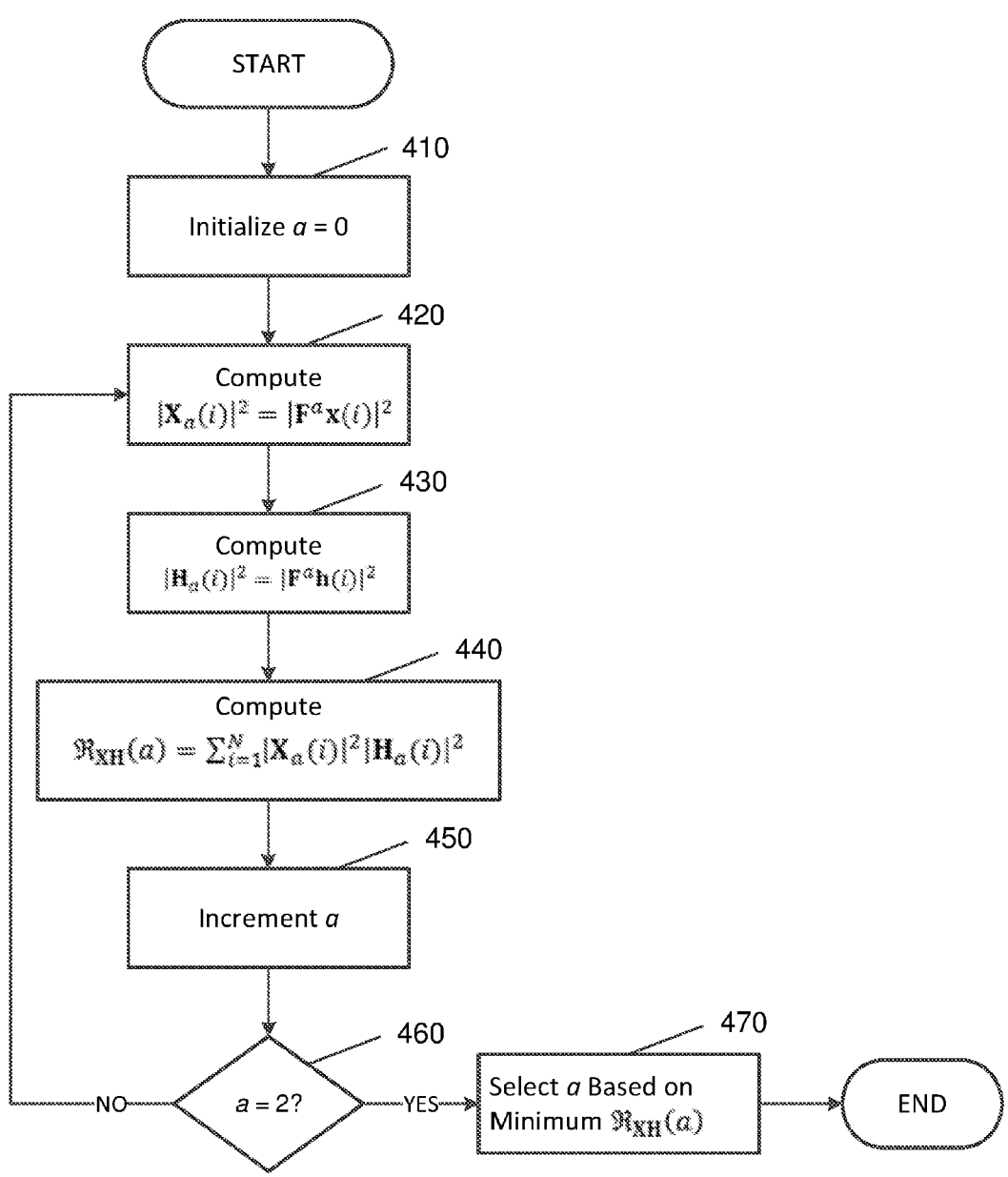
FIG. 4 is a flowchart illustrating a process for finding the optimum value of a when a complex, time-varying channel is present as the interferer, according to an embodiment of the present invention.

FIG. 4 is a flowchart 400 illustrating a process for finding the optimum value of a when a complex, time-varying channel is present as the interferer, according to an embodiment of the present invention. The process begins with initializing a=0 at 410. The energy of the FrFT of the SOI is computed using $|X_a(i)|^2=|F^a h(i)|^2$ at 420. The energy of the FrFT of the complex, time-varying channel is computed using $|H_a(i)|^2=|F^a h(i)|^2$ at 430. Then, a summation of the values of the product of the energies is computed over a new time-frequency axis $t_a$ defined by the rotational parameter a using $\Re_{XH}(a)=\Sigma_{i=1}^N |X_a(i)|^2 |H_a(i)|^2$ at 440, and a is incremented at 450.

If a is not yet equal to 2 at 460, the process of steps 420, 430, 440 are repeated. If a=2 at 460, a is selected based on a value where $\Re_{XH}(a)$ is minimum at 470. The process then ends.

Once the best a is determined, the filter coefficients $g_0$ may be computed in Eq. (14) using the correlations subtraction architecture of the reduced rank multistage Wiener filter (CSA-MWF) instead of using the MMSE solution given in Eq. (15). The performance improvements of using the CSA-MWF are discussed later herein, especially at low SNR.

MWF offers the advantage of often exceeding MMSE performance without any computationally complex matrix inversion or eigen-decompositions. These advantages exist in the FrFT domain as well. The recursion equations for the CSA-MWF are shown in Table I below. Rank reduction is achieved because it is possible to set D<N. The filter may be initialized in the conventional way, except that all variables may be transformed to the FrFT domain first. Thus, using the value of a obtained above, let $$d_0(i)=(F^a x(i))^T \quad (24)$$

and $$x_0(i)=Z(i) \quad (25)$$

The CSA-MWF computes the D scalar weights $w_j$, j=1,2,..., D, from which the optimum filter $$g_{0,WD\text{-}FrFT}=w_1 h_1 - w_1 w_2 h_2 + \cdots -(-1)^D w_1 w_2 \ldots w_D h_D \quad (26)$$

is formed.

TABLE I

RECURSION EQUATIONS FOR CSA-MWF
Initialization: $d_0(i)$ and $x_0(i)$

Forward Recursion: for j = 1, 2, ..., D:

$$h_j = \frac{\Sigma_\Omega \{d_{j-1}^*(i) x_{j-1}(i)\}}{\|\Sigma_\Omega \{d_{j-1}^*(i) x_{j-1}(i)\}\|}$$

$$d_j(i) = h_j^H x_{j-1}(i)$$
$$x_j(i) = x_{j-1}(i) - h_j d_j(i)$$
Backward Recursion: $\epsilon_D(i) = d_D(i)$
for j = D, D − 1, ..., 1:

$$w_j = \frac{\Sigma_\Omega \{d_{j-1}^*(i) \epsilon_j(i)\}}{\Sigma_\Omega \{|\epsilon_j(i)|^2\}}$$

$$\epsilon_{j-1}(i) = d_{j-1}(i) - w_j^* \epsilon_j(i)$$

Simulations

Simulation examples are presented below to compare the proposed MMSE-FrFT and MMSE-FFT approaches to the proposed WD-FrFT approach of some embodiments for calculating the optimum FrFT rotational parameter a. The adaptive filter coefficients were computed for the three techniques from Eq. (15), (19), and (26), respectively. The computed coefficients were then used to compute the resultant error between the true and estimated SOI from Eq. (12) and (13). As previously mentioned, the SOI is allowed to be a digital binary sequence whose elements are uniformly generated and in (−1, +1) that it is desirable to estimate in the presence of non-stationary interference and AWGN. Here, the carrier is ignored, and hence, the SOI is modeled as a baseband BPSK signal. The signal is upsampled to generate N samples per block with $N_1$ bits per block. Initially, it is assumed that N=8 and $N_1$=4 so that oversampling by 2 samples per bit (SPB) occurs. The strength of the interfering signal is varied by setting its amplitude based upon a desired carrier-to-interference ratio (CIR), and the amplitude of the AWGN is set based upon a desired $E_b/N_0$. Specifically, the amplitude of the SOI is set to A=1 by normalizing by $\sqrt{N}$ and the amplitude of the interferer is set to $A_1=10^{-CIR/20}$, where the CIR is given in decibels (dB). Note a negative CIR means that the interferer is stronger than the SOI. The amplitude of the AWGN is further set to be $$\sigma_N = \sqrt{\frac{1}{2 \cdot 10^{\frac{E_b/N_0}{10}}}} \quad (27)$$

Unless otherwise stated, the algorithm was run using M=1000 trials to obtain histograms of the error estimates using the three algorithms.

In the first example, the interfering signal is allowed to take the form of a chirp signal, given by $$x_I(i) = e^{-j1.73\pi(i/f_s)^2} \quad (28)$$

Figure 5:
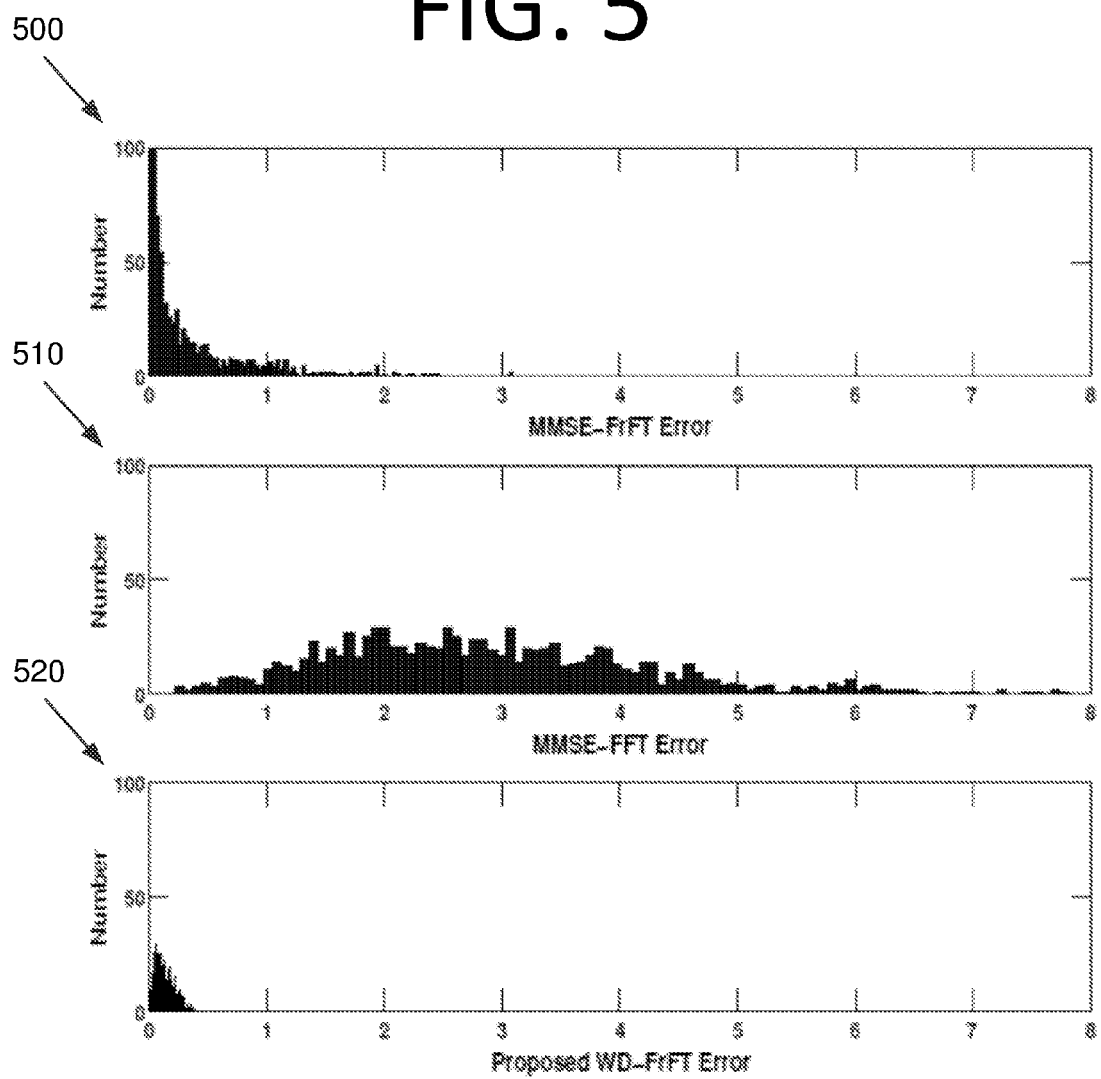
FIG. 5 illustrates graphs comparing histograms of mean-square error for MMSE-FrFT, MMSE-FFT, and WD-FrFT for example 1, according to an embodiment of the present invention.

The CIR is set to −10 dB so that the interference is much stronger than the SOI, and $E_b/N_0$=10 dB. Sampling is performed at 2 SPB so that $f_s=2R_b$ samples per second, where the bit rate is $R_b$=1000 bits per second. Graphs 500, 510, 520 comparing the histograms of the mean-square error of MMSE-FrFT, MMSE-FFT, and WD-FrFT, respectively, are shown in FIG. 5. If averaged over 1,000 trials, the error mean and variances are obtained as follows: $\mu_{MMSE-FrFT}$=0.278, $\mu_{MMSE-FFT}$=2.87, $\mu_{WD-FrFT}$=0.13, $\sigma^2_{MMSE-FrFT}$=0.20, $\sigma^2_{MMSE-FFT}$=1.84, and $\sigma^2_{WD-FrFT}$=0.006.

Figure 6:
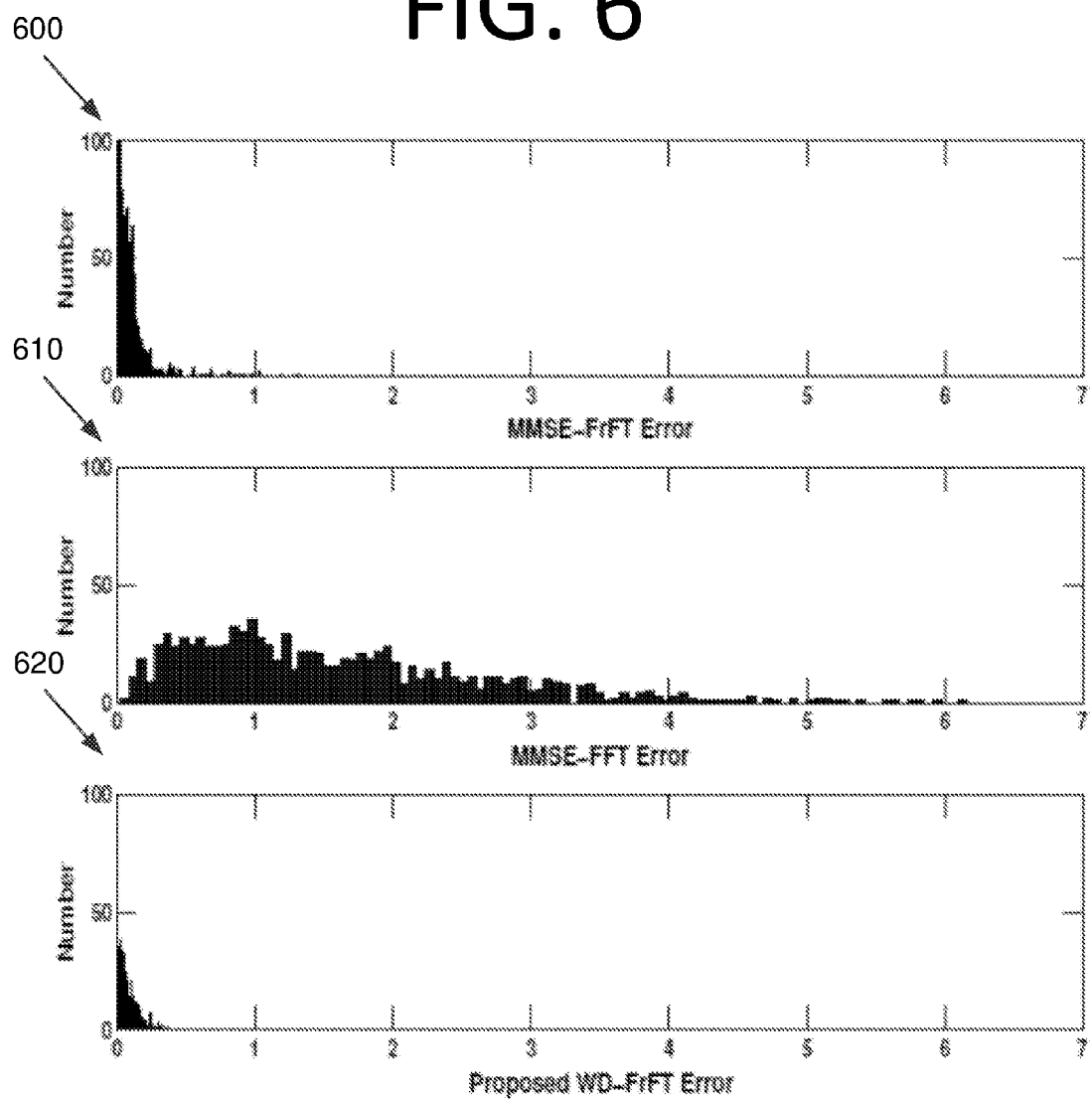
FIG. 6 illustrates graphs comparing histograms of mean-square error for MMSE-FrFT, MMSE-FFT, and WD-FrFT for example 2, according to an embodiment of the present invention.

In the second example, an interference signal taking on the form of a Gaussian pulse is used, given by $$x_I(i) = \beta e^{-\pi(\frac{i}{f_s}-\phi)^2} \quad (29)$$

where β and φ are the amplitude and phase of the pulse, respectively, uniformly distributed in (1,1.5). All other parameters are the same as in example 1. The interference is again scaled with amplitude $A_I$ to give CIR=−10 dB. Graphs 600, 610, 620 comparing the histograms of the mean square error of MMSE-FrFT, MMSE-FFT, and WD-FrFT, respectively, are shown in FIG. 6. Averaging over the 1,000 trials gives: $\mu_{MMSE-FrFT}$=0.096, $\mu_{MMSE-FFT}$=1.60, $\mu_{WD-FrFT}$=0.069, $\sigma^2_{MMSE-FrFT}$=0.020, $\sigma^2_{MMSE-FFT}$=1.22, and $\sigma^2_{WD-FrFT}$=0.004.

In the third example, it is assumed that there is no interference, but instead, there is a non-stationary channel h(i) that corrupts the signal. The channel is modeled as a time-varying, bandpass signal whose center frequency is changing with time, given by $$h(i) = e^{-j2\pi(\frac{i}{f_s})^2} sinc\left(\frac{i}{f_s}\right) \quad (30)$$

Figure 7:
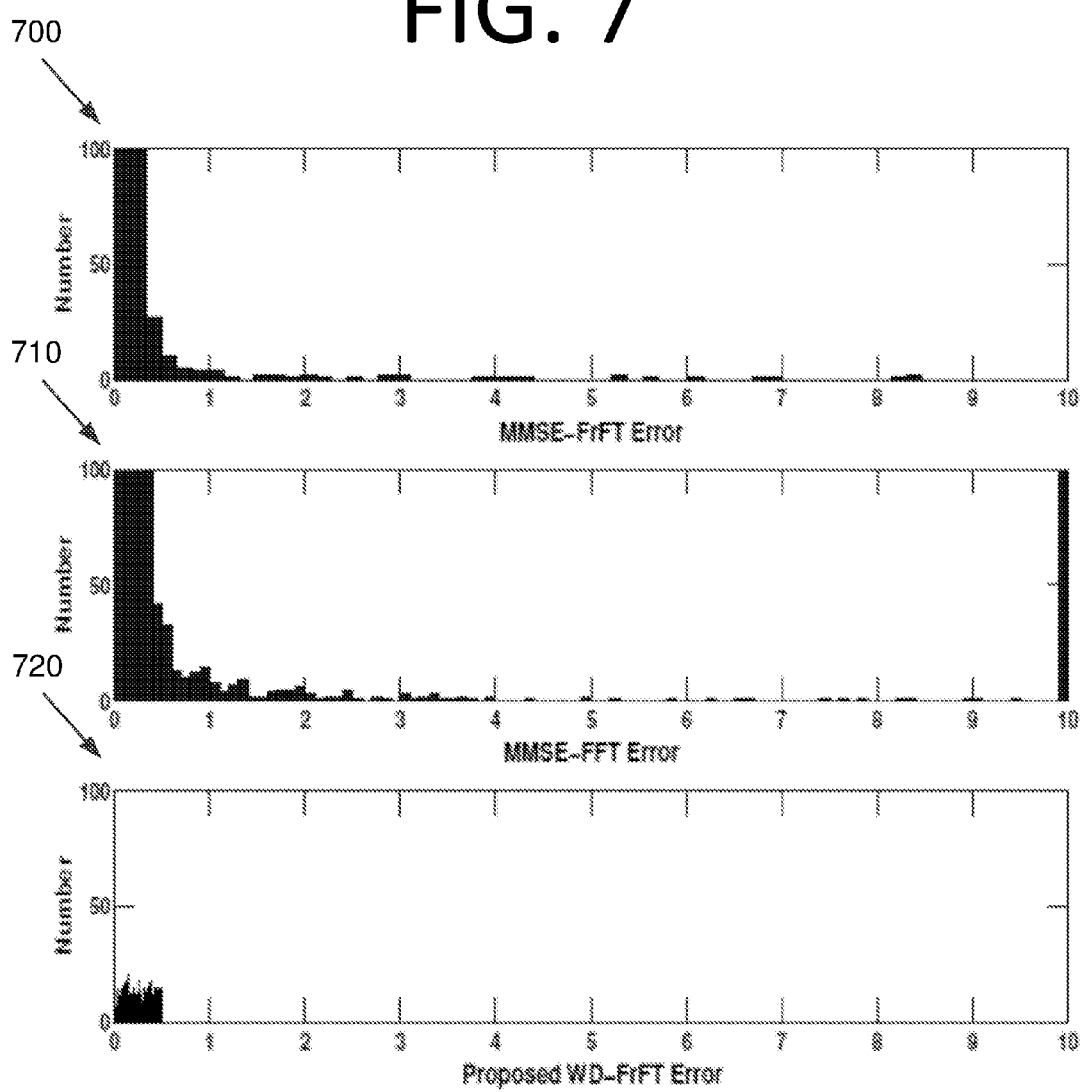
FIG. 7 illustrates graphs comparing histograms of mean-square error for MMSE-FrFT, MMSE-FFT, and WD-FrFT for example 3, according to an embodiment of the present invention.

L=7 samples of the channel are taken to form the channel vector and the channel vector is normalized to have unity in amplitude. Now there is no interference, so CIR=∞ and $E_b/N_0$=−10 dB. Graphs 700, 710, 720 of FIG. 7 compare the histograms of the mean-square error of MMSE-FrFT, MMSE-FFT, and WD-FrFT, respectively. Here, the FFT-MMSE approach fails, producing large error (>>10), so the error is limited to a maximum of 10 for display purposes. Thus, the MMSE-FFT results are worse than shown and calculated here: $\mu_{MMSE-FrFT}$=0.278, $\mu_{MMSE-FFT}$=2.33, $\mu_{WD-FrFT}$=0.258, $\sigma^2_{MMSE-FrFT}$=1.3, $\sigma^2_{MMSE-FFT}$=14.55, and $\sigma^2_{WD-FrFT}$=0.02.

Note that now, performance of the proposed WD-FrFT is much better than MMSE-FrFT and MMSE-FFT, which both fail due to their inability to remove a non-stationary channel that is corrupting the SOI in a non-additive way. Also, because the $E_b/N_0$ is so low, all techniques suffer much larger errors. However, the WD-FrFT continues to produce much smaller estimation errors than the other two approaches.

Figure 8:
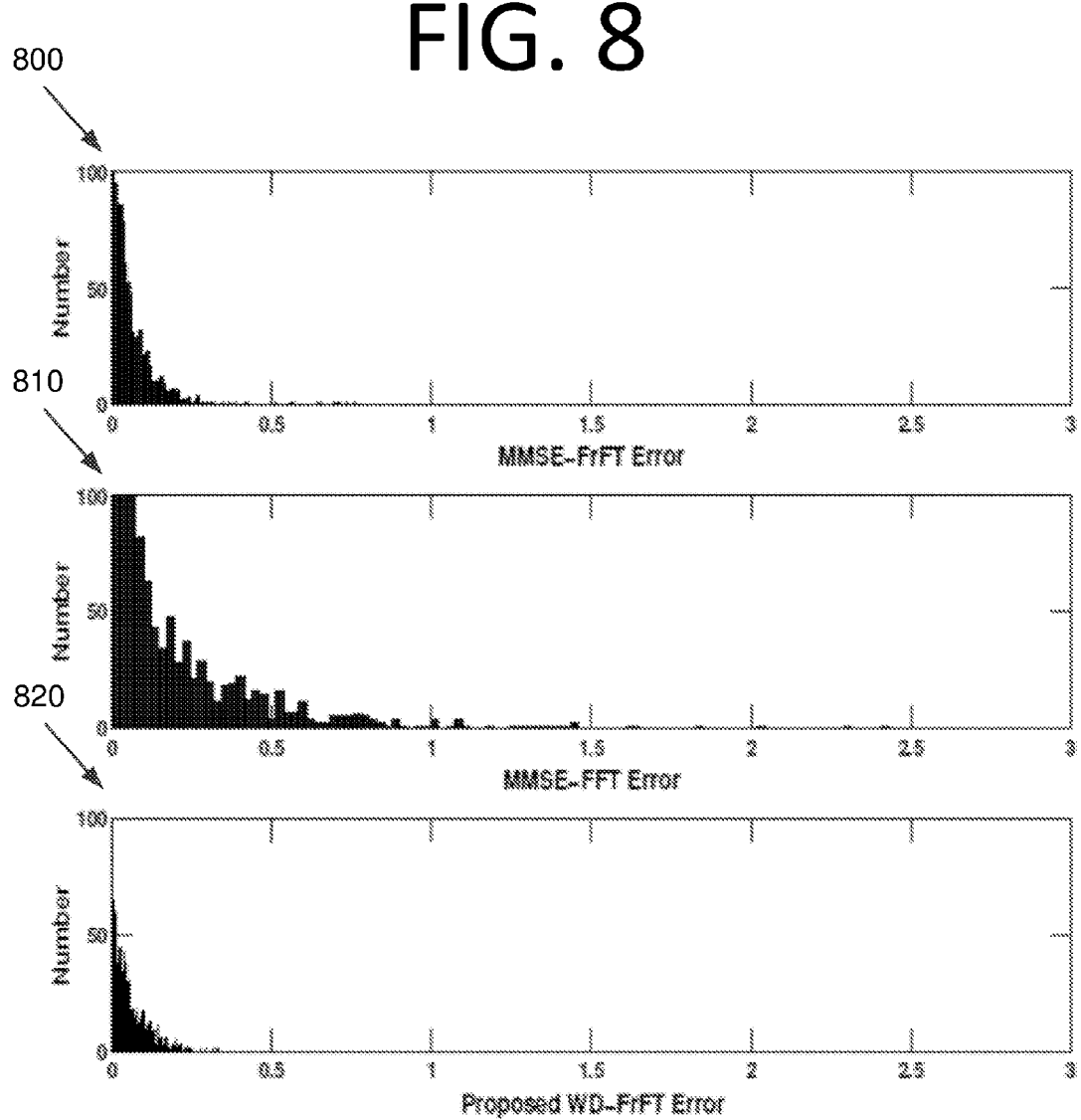
FIG. 8 illustrates graphs comparing histograms of mean-square error for MMSE-FrFT, MMSE-FFT, and WD-FrFT for example 4, according to an embodiment of the present invention.

In the fourth example, it is assumed that there is interference and a non-stationary channel h(i) that corrupts the signal. The interference is the same as in the second example, and the channel is the same as in the third example It is assumed that there is no knowledge of the channel, so that the WD-FrFT algorithm uses solely the measured interference to compute the best a. Furthermore, CIR=−10 dB and $E_b/N_0$=10 dB. Graphs 800, 810, 820 of FIG. 8 compare the histograms of the mean-square error of MMSE-FrFT, MMSE-FFT, and WD-FrFT, respectively. The following are computed: $\mu_{MMSE-FrFT}$=0.059, $\mu_{MMSE-FFT}$=0.223, $\mu_{WD-FrFT}$=0.053, $\sigma^2_{MMSE-FrFT}$=0.006, $\sigma^2_{MMSE-FFT}$=0.08, and $\sigma^2$WD-FrFT=0.003. Due to the lack of knowledge of the corrupting channel, WD-FrFT performance degrades over the previous examples, but it still continues to outperform the other approaches.

Figure 9:
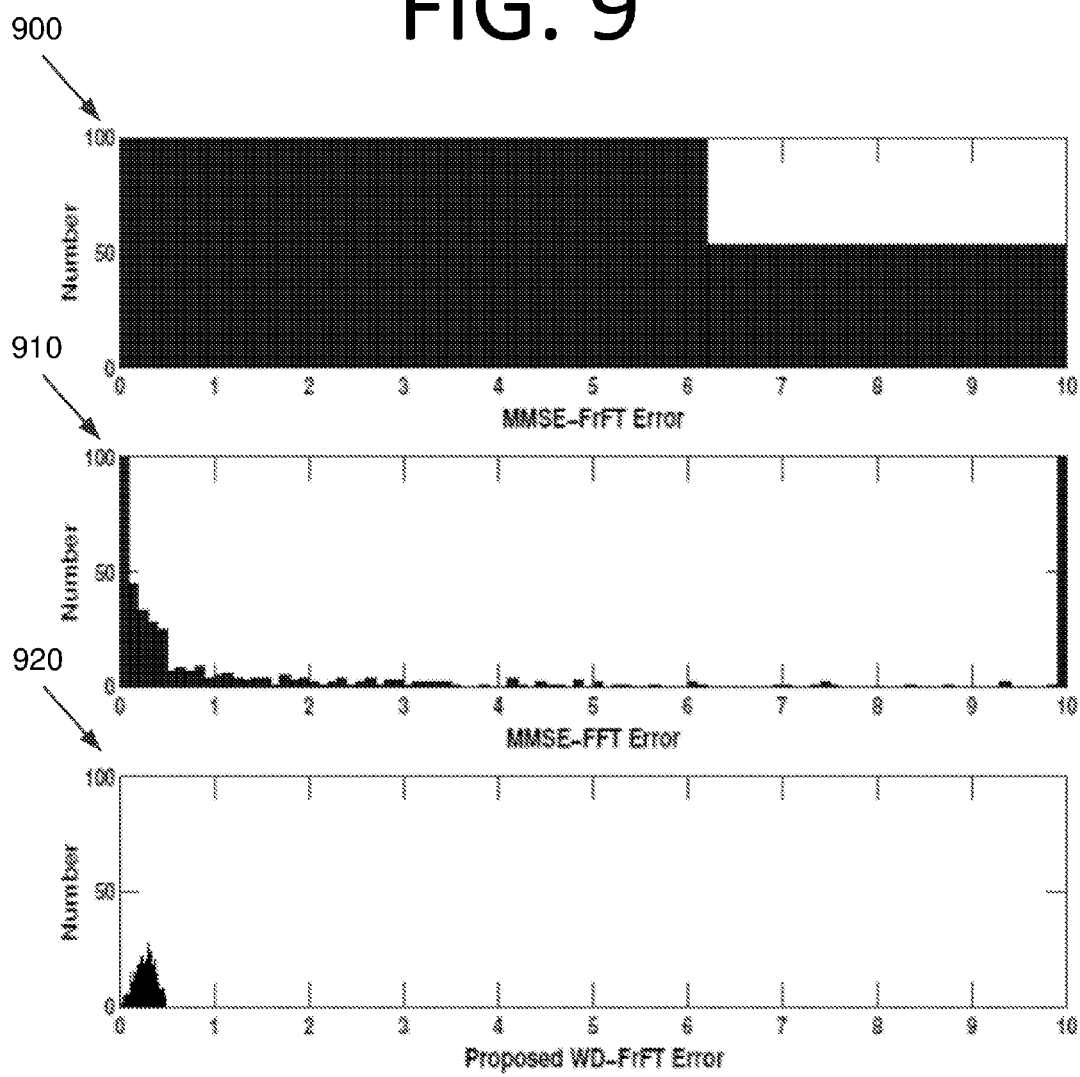
FIG. 9 illustrates graphs comparing histograms of mean-square error for MMSE-FrFT, MMSE-FFT, and WD-FrFT for example 5, according to an embodiment of the present invention.

In the fifth example, it is assumed that the interference and channel are the same as in example 4. It is also again assumed that no knowledge of the channel exists. However, in this case, CIR=−10 dB and $E_b/N_0$=10 dB. Graphs 900, 910, 920 of FIG. 9 compare the histograms of the mean-square error of MMSE-FrFT, MMSE-FFT, and WD-FrFT, respectively. Here, the MMSE-FFT approach fails again, so the error is limited to a maximum of 10 to prevent large errors. Again, this means that the MMSE-FFT results are worse than shown: $\mu_{MMSE-FrFT}$=7.27, $\mu_{MMSE-FFT}$=6.31, $\mu_{WD-FrFT}$=0.276, $\mu^2_{MMSE-FrFT}$=1376, $\sigma^2_{MMSE-FFT}$=20.7, and $\sigma^2_{WD-FrFT}$=0.01.

Here, it can be seen that both MMSE-FrFT and MMSE-FFT fail terribly because they cannot correct for the non-stationary interference and channel with such a low SNR. The WD-FrFT technique also degrades due to the lack of channel knowledge and the low SNR. However, WD-FrFT but still performs far better than the other two techniques because it is able to estimate and remove the high powered interfering signal.

If the computational complexity of each of these algorithms is measured, which includes estimating a and then using the computed value to find the best estimate of the transmitted signal x̂(i), it can be seen that the proposed WD-FrFT algorithm performs 3-5 times faster than the MMSE-FrFT algorithm, whereas the MMSE-FFT algorithm is about 20 times faster than MMSE-FrFT. However, the MMSE-FFT algorithm operates on signals in the frequency domain only, and thus is sub-optimal in the presence of non-stationary interference or channels. The MMSE-FrFT algorithm also fails to perform well if the CIR or $E_b/N_0$ is low. The proposed WD-FrFT algorithm of some embodiments, however, performs well over the entire range of parameters.

Some embodiments present a novel approach for obtaining the best estimate of the rotational parameter a when computing a FrFT to suppress non-stationary interference. The algorithm is robust in low sample support, low CIRs, and low $E_b/N_0$. Because the algorithm of some embodiments finds an optimum time-frequency axis in which to filter a signal and eliminate interference, it greatly outperforms previous approaches based solely on time or frequency analysis, because those approaches are restricted to a single dimension and may not be able to adequately isolate the SOI from the interference.

The proposed approach of some embodiments greatly outperforms existing time-frequency MMSE approaches, which fail in low sample support or high interference because they rely on using the received signal, which does not isolate the SOI from the interference. MMSE approaches also require large sample support, which is only available in stationary environments. Use of the technique of some embodiments may greatly enhance the ability to demodulate signals in high interference environments, and if a rotational axis can be found where the interference does not overlap the SOI, perfect interference cancellation may be performed. Future work is to apply the newly developed algorithm to other applications in signal and image processing, and to real-life stressing signal processing problems.

Figure 10:
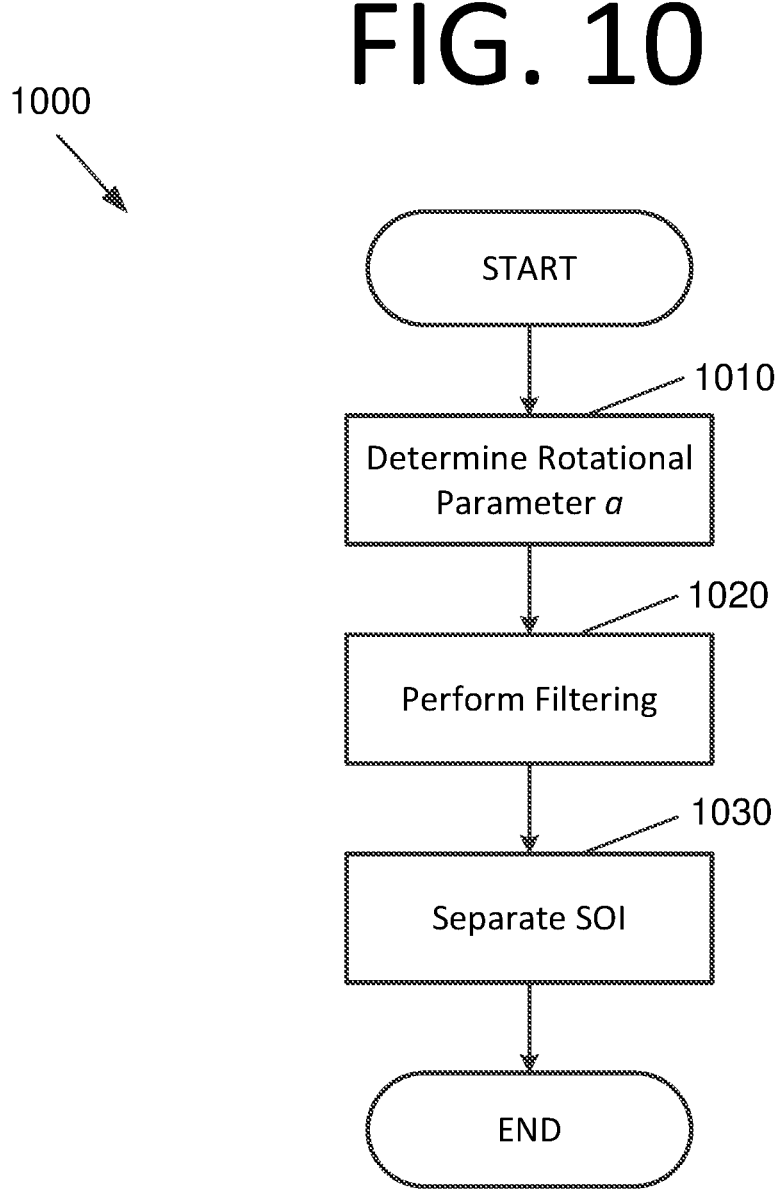
FIG. 10 is a flowchart illustrating a process for determining a rotational parameter a for a FrFT and separating a SOI from interference, noise, a complex, time-varying channel, or any combination thereof, according to an embodiment of the present invention.

FIG. 10 is a flowchart 1000 illustrating a process for determining a rotational parameter a for a FrFT and separating a SOI from interference, noise, a complex, time-varying channel, or any combination thereof, according to an embodiment of the present invention. The process begins with determining a value of a rotational parameter a for a FrFT for which a projection of a product of a WD reduces interference, noise, a complex, time-varying channel, or any combination thereof, in a received signal so that a SOI can be separated at 1010. In some embodiments, a may be determined by the processes of FIGS. 2, 3, and/or 4. The SOI may include, but is not limited to, a cellular communication signal, a satellite communication signal, a radar signal, an image signal, a speech signal, or any combination thereof without deviating from the scope of the invention. A transmitter of the received signal may be non-stationary due to movement, Doppler shift, time-varying signals, drifting frequencies, or any combination thereof. In some embodiments, the received signal cannot be separated in both a time domain and a frequency domain The value of the rotational parameter a may correspond to a value for which a product of energies of the SOI and the interference, noise, complex, time-varying channel, or any combination thereof, is minimized in the FrFT domain The rotational parameter a may also be selected such that the SOI and the interference, noise, complex, time-varying channel, or any combination thereof, overlap as little as possible. The number of samples used for determining a may be four or eight samples per bit in some embodiments. However, any other number of samples may be used without deviating from the scope of the invention.

The interference, noise, complex, time-varying channel, or any combination thereof is then filtered out at 1020. In some embodiments, the filtering may be performed by employing a reduced rank MWF to remove non-stationary interference along an optimum FrFT axis $t_a$ of the WD. In certain embodiments, filter coefficients $g_0$ may be computed using CSA-MWF. In some embodiments, an optimum filter of Eq. (26) may be obtained using the CSA-MWF, and used to filter out the interference, noise, complex, time-varying channel, or any combination thereof. The SOI is then separated out from the interference, noise, complex, time-varying channel, or any combination thereof at 1030.

Figure 11:
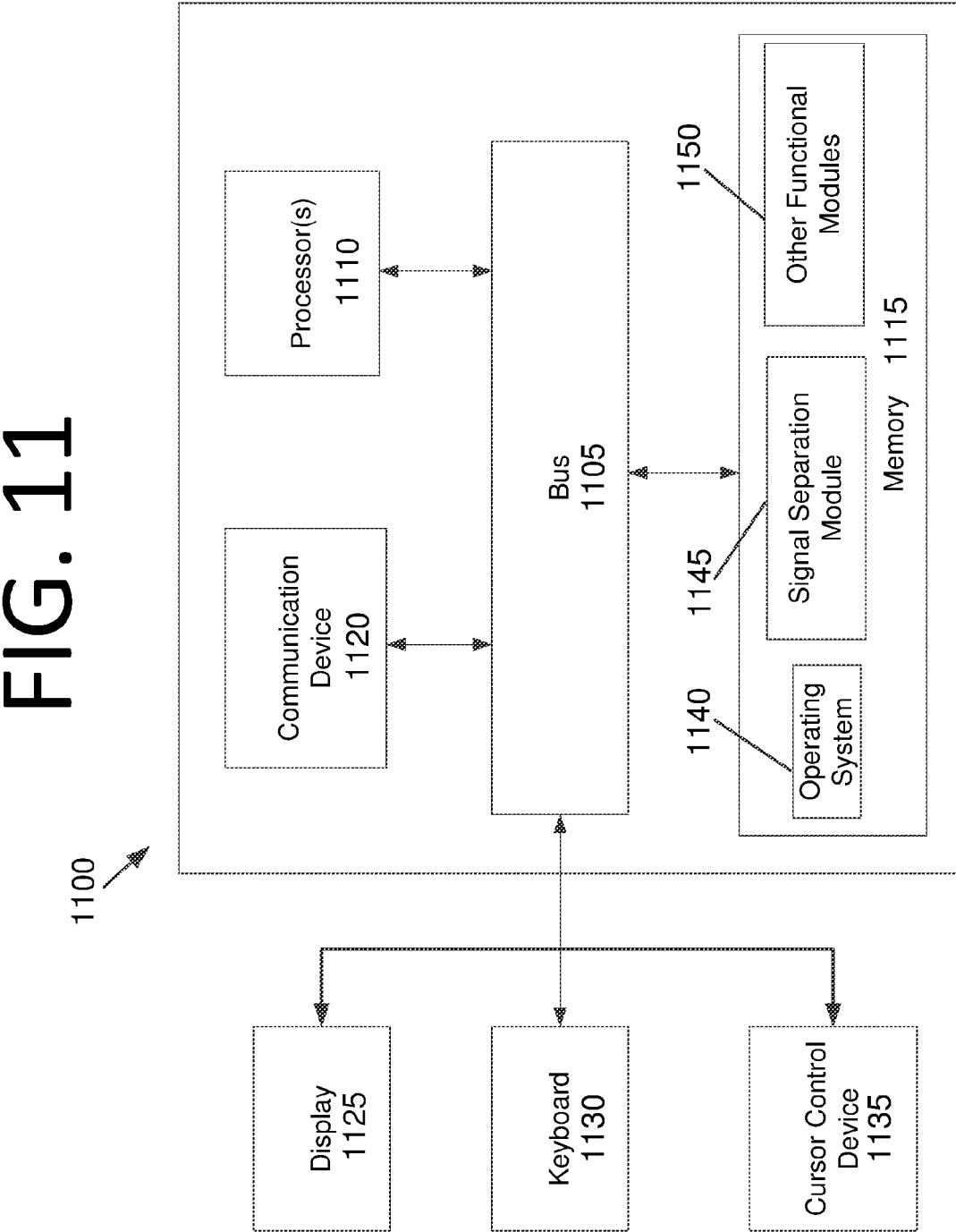
FIG. 11 illustrates a computing system configured to separate a SOI from interference/noise using WD-FrFT, according to an embodiment of the present invention.

FIG. 11 illustrates a computing system 1100 configured to separate a SOI from interference/noise using WD-FrFT, according to an embodiment of the present invention. System 1100 includes a bus 1105 or other communication mechanism for communicating information, and processor(s) 1110 coupled to bus 1105 for processing information. Processor(s) 1110 may be any type of general or specific purpose processor, including a central processing unit ("CPU") or application specific integrated circuit ("ASIC"). Processor(s) 1110 may also have multiple processing cores, and at least some of the cores may be configured for specific functions. System 1100 further includes a memory 1115 for storing information and instructions to be executed by processor(s) 1110. Memory 1115 can be comprised of any combination of random access memory ("RAM"), read only memory ("ROM"), flash memory, cache, static storage such as a magnetic or optical disk, or any other types of non-transitory computer-readable media or combinations thereof. Additionally, system 1100 includes a communication device 1120, such as a transceiver, to wirelessly provide access to a communications network. Communication device 1120 may receive a signal including the SOI and interference/noise.

Non-transitory computer-readable media may be any available media that can be accessed by processor(s) 1110 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1110 are further coupled via bus 1105 to a display 1125, such as a Liquid Crystal Display ("LCD"), for displaying information to a user. A keyboard 1130 and a cursor control device 1135, such as a computer mouse, are further coupled to bus 1105 to enable a user to interface with system 1100. However, in certain embodiments such as those for mobile computing implementations, a physical keyboard and mouse may not be present, and the user may interact with the device solely through display 1125 and/or a touchpad (not shown). Any type and combination of input devices may be used as a matter of design choice.

In one embodiment, memory 1115 stores software modules that provide functionality when executed by processor(s) 1110. The modules include an operating system 1140 for system 1100. The modules further include a signal separation module 1145 that is configured to separate a SOI from interference/noise using WD-FrFT. System 1100 may include one or more additional functional modules 1150 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2 and 8-10 may be performed by a computer program, encoding instructions for the nonlinear adaptive processor to perform at least the processes described in FIGS. 2 and 8-10, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 2 and 8-10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   determining, by a computing system, a value of a rotational parameter a for a Fractional Fourier Transform (FrFT) for which a projection of a product of a Wigner Distribution (WD) reduces interference, noise, a complex, time-varying channel, or any combination thereof, in a received signal so that a signal-of-interest (SOI) can be separated;
   filtering out the interference, noise, complex, time-varying channel, or any combination thereof, by the computing system; and separating out the SOI from the interference, noise, complex, time-varying channel, or any combination thereof, by the computing system.

2. The computer-implemented method of claim 1, wherein the value of the rotational parameter a corresponds to a value for which a product of energies of the SOI and the interference, noise, complex, time-varying channel, or any combination thereof, is minimized in the FrFT domain.

3. The computer-implemented method of claim 1, wherein the SOI comprises a cellular communication signal, a satellite communication signal, a radar signal, an image signal, a speech signal, or any combination thereof.

4. The computer-implemented method of claim 1, wherein a transmitter of the received signal is non-stationary due to movement, Doppler shift, time-varying signals, drifting frequencies, or any combination thereof.

5. The computer-implemented method of claim 1, wherein the received signal cannot be separated in both a time domain and a frequency domain.

6. The computer-implemented method of claim 1, wherein the filtering further comprises employing a reduced rank multistage Wiener filter (MWF) to remove non-stationary interference along an optimum FrFT axis $t_a$ of the WD.

7. The computer-implemented method of claim 1, wherein a number of samples used for the determination is four or eight samples per bit.

8. The computer-implemented method of claim 1, wherein the rotational parameter a is selected such that the SOI and the interference, noise, complex, time-varying channel, or any combination thereof, overlap as little as possible.

9. The computer-implemented method of claim 1, wherein the computing of the parameter a comprises:
computing, by the computing system, energies of the FrFTs of both the SOI and the interference, noise, complex, time-varying channel, or any combination thereof;
computing a summation of values of a product of the energies of the SOI and the interference, noise, complex, time-varying channel, or any combination thereof, by the computing system, over a new time-frequency axis $t_a$ defined by the rotational parameter a; and
selecting a value of a, by the computing system, for which a result is minimum as an optimum a.

10. The computer-implemented method of claim 1, wherein the computing of the rotational parameter a comprises:
initializing a to 0, by the computing system;
computing an energy of a FrFT of the SOI a using $|X_a(i)|^2 = |F^a x(i)|^2$, by the computing system;
computing an energy of a FrFT of the interference, noise, or both, using $|X_{I_a}(i)|^2 = |F^a x_I(i)|^2$, by the computing system;
computing a summation of values of the product of the energies, by the computing system, over a new time-frequency axis $t_a$ defined by the rotational parameter a, using $\Re_{XX_I}(a) = \Sigma_{i=1}^{N} |X_a(i)|^2 |X_{I_a}(i)|^2$;
incrementing a, by the computing system;
repeating the computing steps above, by the computing system, until a=2; and
when a=2, selecting a based on a value where $\Re_{XX_I}(a)$ is minimum, by the computing system.

11. The computer-implemented method of claim 1, wherein the computing of the rotational parameter a comprises:
initializing a to 0, by the computing system;
computing an energy of a FrFT of the SOI as $|X_a(i)|^2 = |F^a x(i)|^2$, by the computing system;
computing an energy of a FrFT of the complex, time-varying channel as $|H_a(i)|^2 = |F^a h(i)|^2$, by the computing system;
computing a summation of values of the product of the energies, by the computing system, over a new time-frequency axis $t_a$ defined by the rotational parameter a, using $\Re_{XH}(a) = \Sigma_{i=1}^{N} |X_a(i)|^2 |H_a(i)|^2$;
incrementing a, by the computing system;
repeating the computing steps above, by the computing system, until a=2; and
when a=2, selecting a based on a value where $\Re_{XH}(a)$ is minimum, by the computing system.

12. The computer-implemented method of claim 1, wherein the filtering further comprises:
computing filter coefficients $g_0$, by the computing system, using a correlations subtraction architecture of a reduced rank multistage Wiener filter (CSA-MWF).

13. The computer-implemented method of claim 12, wherein recursion equations for the CSA-MWF are given by for $j = 1, 2, \ldots, D$:

$$h_j = \frac{\sum_{\Omega} \{d_{j-1}^*(i) x_{j-1}(i)\}}{\left\| \sum_{\Omega} \{d_{j-1}^*(i) x_{j-1}(i)\} \right\|}$$

$$d_j(i) = h_j^H x_{j-1}(i)$$

$$x_j(i) = x_{j-1}(i) - h_j d_j(i)$$

for forward recursion and $$\epsilon_D(i) = d_D(i)$$

for $j = D, D-1, \ldots, 1$:

$$w_j = \frac{\sum_{\Omega} \{d_{j-1}^*(i) \epsilon_j(i)\}}{\sum_{\Omega} \{|\epsilon_j(i)|^2\}}$$

$$\epsilon_{j-1}(i) = d_{j-1}(i) - w_j^* \epsilon_j(i)$$

for backward recursion.

14. The computer-implemented method of claim 12, wherein an optimum filter $$g_{0,WD\text{-}FrFT} = w_1 h_1 - w_1 w_2 h_2 + \ldots -(-1)^D w_1 w_2 \ldots w_D h_D$$

is obtained from computing scalar weights using the CSA-MWF.

15. A computer program embodied on a non-transitory computer-readable medium, the program configured to cause at least one processor to:
determine a value of a rotational parameter a for a Fractional Fourier Transform (FrFT) for which a new time-frequency axis $t_{60}$ defined by the rotational parameter a reduces interference, noise, a complex, time-varying channel, or any combination thereof, in a received signal so that a signal-of-interest (SOI) can be separated; and
separate out the SOI from the interference, noise, complex, time-varying channel, or any combination thereof, by filtering out the interference, noise, complex, time-varying channel, or any combination thereof.

16. The computer program of claim 15, wherein the value of the rotational parameter a corresponds to a value for which a product of energies of the SOI and the interference, noise, complex, time-varying channel, or any combination thereof, is minimized in the FrFT domain.

17. The computer program of claim 15, wherein the SOI comprises a cellular communication signal, a satellite communication signal, a radar signal, an image signal, a speech signal, or any combination thereof.

18. The computer program of claim 15, wherein a transmitter of the received signal is non-stationary due to movement, Doppler shift, time-varying signals, drifting frequencies, or any combination thereof.

19. The computer program of claim 15, wherein the received signal cannot be separated in both a time domain and a frequency domain.

20. The computer program of claim 15, wherein the filtering further comprises employing a reduced rank multistage Wiener filter (MWF) to remove non-stationary interference along an optimum FrFT axis $t_a$ of the WD.

21. The computer program of claim 15, wherein a number of samples used for the determination is four or eight samples per bit.

22. The computer program of claim 15, wherein the rotational parameter a is selected such that the SOI and the interference, noise, complex, time-varying channel, or any combination thereof, overlap as little as possible.

23. The computer program of claim 15, wherein the computing of the parameter a comprises:
    computing energies of the FrFTs of both the SOI and the interference, noise, complex, time-varying channel, or any combination thereof;
    computing a summation of values of a product of the energies of the SOI and the interference, noise, complex, time-varying channel, or any combination thereof, over the time-frequency axis $t_a$; and
    selecting a value of a for which a result is minimum as an optimum a.

24. The computer program of claim 15, wherein the computing of the rotational parameter a comprises:
    initializing a to 0;
    computing an energy of a FrFT of the SOI using $|X_a(i)|^2 = |F^a x(i)|^2$;
    computing an energy of a FrFT of the interference, noise, or both, using $|X_{I_a}(i)|^2 = |F^a x_I(i)|^2$;
    computing a summation of values of the product of the energies over $t_a$ using $\mathcal{R}_{XX_I}(a) = \sum_{i=1}^{N} |X_a(i)|^2 |X_{I_a}(i)|^2$;
    incrementing a;
    repeating the computing steps above until a=2; and
    when a=2, selecting a based on a value where $\mathcal{R}_{XX_I}(a)$ is minimum.

25. The computer program of claim 15, wherein the computing of the rotational parameter a further comprises:
    initializing a to 0;
    computing an energy of a FrFT of the SOI as $|X_a(i)|^2 = |F^a x(i)|^2$;
    computing an energy of a FrFT of the complex, time-varying channel as $|H_a(i)|^2 = |F^a h(i)|^2$;
    computing a summation of values of the product of the energies over $t_a$ using $\mathcal{R}_{XH}(a) = \sum_{i=1}^{N} |X_a(i)|^2 |H_a(i)|^2$;
    incrementing a;
    repeating the computing steps above until a=2; and
    when a=2, selecting a based on a value where $\mathcal{R}_{XH}(a)$ is minimum.

26. The computer program of claim 15, wherein the filtering further comprises:
    computing filter coefficients $g_0$ using a correlations subtraction architecture of a reduced rank multistage Wiener filter (CSA-MWF).

27. The computer program of claim 26, wherein recursion equations for the CSA-MWF are given by for $j = 1, 2, \ldots, D$:

$$h_j = \frac{\sum_\Omega \{d_{j-1}^*(i) x_{j-1}(i)\}}{\left\| \sum_\Omega \{d_{j-1}^*(i) x_{j-1}(i)\} \right\|}$$

$$d_j(i) = h_j^H x_{j-1}(i)$$

$$x_j(i) = x_{j-1}(i) - h_j d_j(i)$$

for forward recursion and $$\epsilon_D(i) = d_D(i)$$

for $j = D, D-1, \ldots, 1$:

$$w_j = \frac{\sum_\Omega \{d_{j-1}^*(i) \epsilon_j(i)\}}{\sum_\Omega \{|\epsilon_j(i)|^2\}}$$

$$\epsilon_{j-1}(i) = d_{j-1}(i) - w_j^* \epsilon_j(i)$$

for backward recursion.

28. The computer program of claim 26, wherein an optimum filter $$g_{0,WD\text{-}FrFT} = w_1 h_1 - w_1 w_2 h_2 + \ldots -(-1)^D w_1 w_2 \ldots w_D h_D$$

is obtained from computing scalar weights using the CSA-MWF.

29. A computer-implemented method, comprising:
    determining, by a computing system, a value of a rotational parameter a for a Fractional Fourier Transform (FrFT) for which a new time-frequency axis $t_a$ defined by the rotational parameter a reduces interference, noise, or both, in a received signal so that a signal-of-interest (SOI) can be separated; and
    separating out, by the computing system, the SOI from the interference, noise, complex, time-varying signal, or any combination thereof, by filtering out the interference, noise, complex time-varying signal, or any combination thereof.

30. The computer-implemented method of claim 29, wherein the value of the rotational parameter a corresponds to a value for which a product of energies of the SOI and the interference, noise, or both, is minimized in the FrFT domain.

31. The computer-implemented method of claim 29, wherein the rotational parameter a is selected such that the SOI and the interference, noise, or both, overlap as little as possible.

32. The computer-implemented method of claim 29, wherein the computing of the parameter a comprises:
    computing, by the computing system, energies of the FrFTs of both the SOI and the interference, noise, or both;

computing a summation of values of a product of the energies of the SOI and the interference, noise, or both, by the computing system, over $t_a$; and selecting a value of a, by the computing system, for which a result is minimum as an optimum a.

33. The computer-implemented method of claim 29, wherein the computing of the rotational parameter a comprises:

initializing a to 0, by the computing system;

computing an energy of a FrFT of the SOI using $|X_a(i)|^2=|F^a x(i)|^2$, by the computing system;

computing an energy of a FrFT of the interference, noise, or both, using $|X_{I_a}(i)|^2=|F^a x_I(i)|^2$, by the computing system;

computing a summation of values of the product of the energies, by the computing system, over $t_a$ using $\mathfrak{R}_{XX_I}(a) = \sum_{i=1}^{N} |X_a(i)|^2 |X_{I_a}(i)|^2$;

incrementing a, by the computing system;

repeating the computing steps above, by the computing system, until a=2; and when a=2, selecting a based on a value where $\mathfrak{R}_{XX_I}(a)$ is minimum, by the computing system.

34. The computer-implemented method of claim 29, wherein the filtering further comprises:

computing filter coefficients $g_0$ using a correlations subtraction architecture of a reduced rank multistage Wiener filter (CSA-MWF).

35. The computer-implemented method of claim 34, wherein recursion equations for the CSA-MWF are given by for $j = 1, 2, \ldots, D$:

$$h_j = \frac{\sum_\Omega \{d_{j-1}^*(i) x_{j-1}(i)\}}{\left\| \sum_\Omega \{d_{j-1}^*(i) x_{j-1}(i)\} \right\|}$$

$$d_j(i) = h_j^H x_{j-1}(i)$$

$$x_j(i) = x_{j-1}(i) - h_j d_j(i)$$

for forward recursion and $$\epsilon_D(i) = d_D(i)$$

for $j = D, D-1, \ldots, 1$:

$$w_j = \frac{\sum_\Omega \{d_{j-1}^*(i) \epsilon_j(i)\}}{\sum_\Omega \{|\epsilon_j(i)|^2\}}$$

$$\epsilon_{j-1}(i) = d_{j-1}(i) - w_j^* \epsilon_j(i)$$

for backward recursion.

36. The computer-implemented method of claim 34, wherein an optimum filter $$g_{0,WD\text{-}FrFT} = w_1 h_1 - w_1 w_2 h_2 + \ldots -(-1)^D w_1 w_2 \ldots w_D h_D$$

is obtained from computing scalar weights using the CSA-MWF.

37. A computer-implemented method, comprising:

determining, by a computing system, a value of a rotational parameter a for a Fractional Fourier Transform (FrFT) for which a new time-frequency axis $t_a$ defined by the rotational parameter a reduces a complex, time-varying channel in a received signal so that a signal-of-interest (SOI) can be separated; and separating out, by the computing system, the SOI from the complex, time-varying channel, or any combination thereof, by filtering out the interference, noise, complex, time-varying channel, or any combination thereof.

38. The computer-implemented method of claim 37, wherein the value of the rotational parameter a corresponds to a value for which a product of energies of the SOI and the complex, time-varying channel is minimized in the FrFT domain.

39. The computer-implemented method of claim 37, wherein the rotational parameter a is selected such that the SOI and the complex, time-varying channel overlap as little as possible.

40. The computer-implemented method of claim 37, wherein the computing of the parameter a comprises:

computing, by the computing system, energies of the FrFTs of both the SOI and the complex, time-varying channel;

computing, by the computing system, a summation of values of a product of the energies of the SOI and the complex, time-varying channel over the time-frequency axis $t_a$; and selecting a value of a, by the computing system, for which a result is minimum as an optimum a.

41. The computer-implemented method of claim 37, wherein the computing of the rotational parameter a further comprises:

initializing a to 0, by the computing system;

computing an energy of a FrFT of the SOI as $|X_a(i)|^2=|F^a x(i)|^2$, by the computing system;

computing an energy of a FrFT of the complex, time-varying channel as $|H_a(i)|^2=|F^a h(i)|^2$, by the computing system;

computing a summation of values of the product of the energies, by the computing system, over $t_a$ using $\mathfrak{R}_{XH}(a) = \sum_{i=1}^{N} |X_a(i)|^2 |H_a(i)|^2$;

incrementing a, by the computing system;

repeating the computing steps above, by the computing system, until a=2; and when a=2, selecting a based on a value where $\mathfrak{R}_{XH}(a)$ is minimum, by the computing system.

42. The computer-implemented method of claim 37, wherein the filtering further comprises:

computing, by the computing system, filter coefficients $g_0$ using a correlations subtraction architecture of a reduced rank multistage Wiener filter (CSA-MWF).

43. The computer-implemented method of claim 42, wherein recursion equations for the CSA-MWF are given by for $j = 1, 2, \ldots, D$:

$$h_j = \frac{\sum_\Omega \{d_{j-1}^*(i) x_{j-1}(i)\}}{\left\| \sum_\Omega \{d_{j-1}^*(i) x_{j-1}(i)\} \right\|}$$

$$d_j(i) = h_j^H x_{j-1}(i)$$

$$x_j(i) = x_{j-1}(i) - h_j d_j(i)$$

for forward recursion and $$\epsilon_D(i) = d_D(i)$$

for $j = D, D-1, \ldots, 1$:

$$w_j = \frac{\sum_\Omega \{d^*_{j-1}(i)\epsilon_j(i)\}}{\sum_\Omega \{|\epsilon_j(i)|^2\}}$$

$$\epsilon_{j-1}(i) = d_{j-1}(i) - w_j^*\epsilon_j(i)$$

for backward recursion.

44. The computer-implemented method of claim 42, wherein an optimum filter $$g_{0,WD\text{-}FrFT} = w_1 h_1 - w_1 w_2 h_2 + \ldots - (-1)^D w_1 w_2 \ldots w_D h_D$$

is obtained from computing scalar weights using the CSA-MWF.

* * * * *